United States Patent
Griffin

[11] 3,748,680
[45] July 31, 1973

[54] TUNNEL CLEANING APPARATUS
[75] Inventor: Kenneth Earl Griffin, Seattle, Wash.
[73] Assignee: Lawrence E. Kramis, Mercer Island, Wash. ; a part interest
[22] Filed: June 14, 1972
[21] Appl. No.: 262,770

[52] U.S. Cl.................................. 15/50 C, 15/21 E
[51] Int. Cl............................................... A47l 1/38
[58] Field of Search.................... 15/21 R, 21 E, 53, 15/97, 98, DIG. 2, 49 C, 50 C

[56] References Cited
UNITED STATES PATENTS
3,460,177 8/1969 Rhinehart et al. .................. 15/21 E
3,680,164 8/1972 Thornton-Trump ................ 15/21 E Primary Examiner—Edward L. Roberts
Attorney—John O. Graybeal, Robert B. Hughes et al.

[57] ABSTRACT

A mobile cleaning apparatus adapted to clean the surface walls of a tunnel. The apparatus comprises a mobile vehicle, such as a flatbed truck, having at the forward end an operator's station, a cleaning assembly at the rear of the truck, and auxiliary equipment located on the flatbed of the truck. The cleaning apparatus comprises a brush assembly mounted to a movable frame assembly, which is in turn mounted to a vertically oriented base frame upstanding from the rear end of the truck. The movable frame assembly comprises a first frame mounted for vertical motion to the base frame, a second frame mounted for lateral movement to the first frame, and a third frame mounted to the second frame for rotation about a longitudinal axis of the apparatus. By selective movement of the vertical, lateral and angular movement of, respectively, the first, second and third movable frames, the brush assembly can be moved to any transverse and angular position for proper engagement of the surface to be cleaned.

14 Claims, 8 Drawing Figures

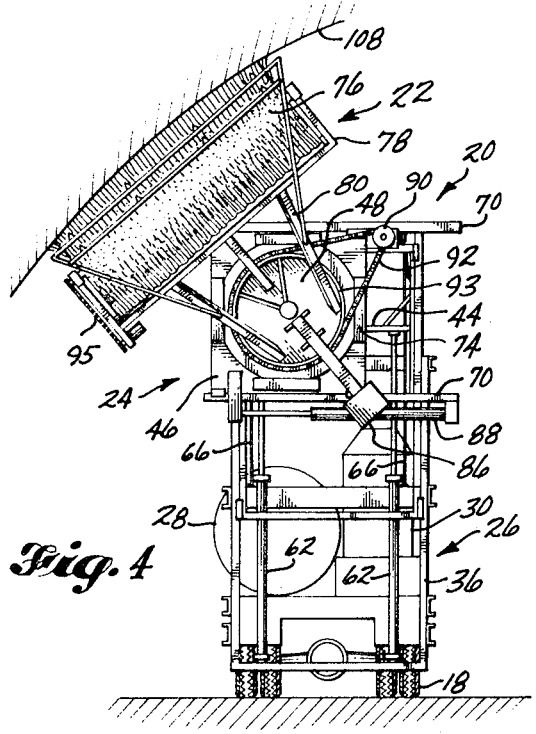
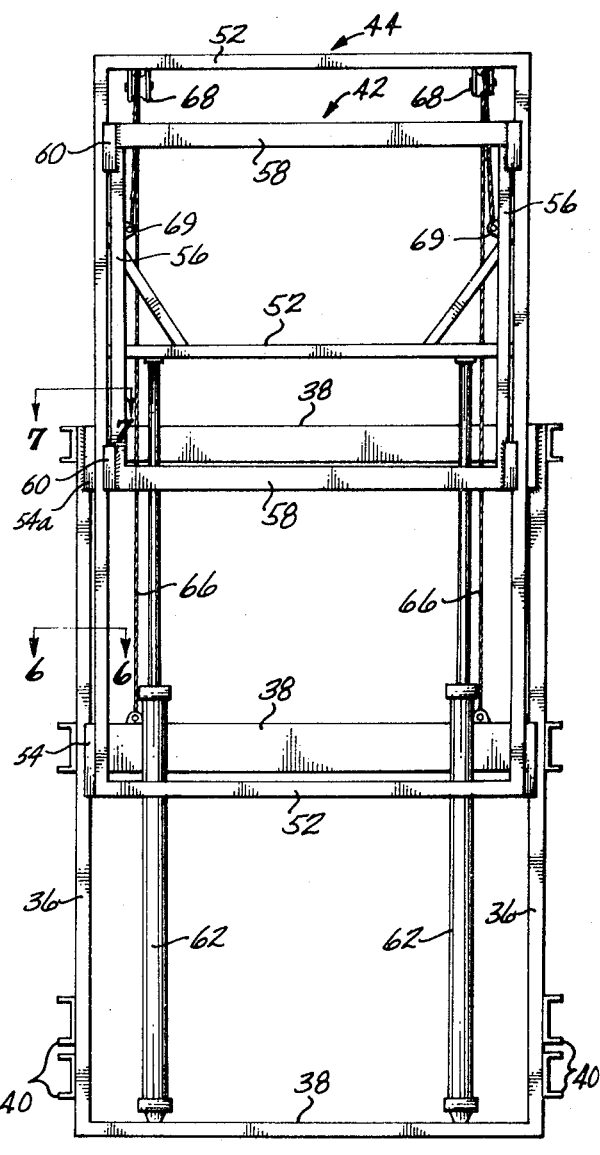
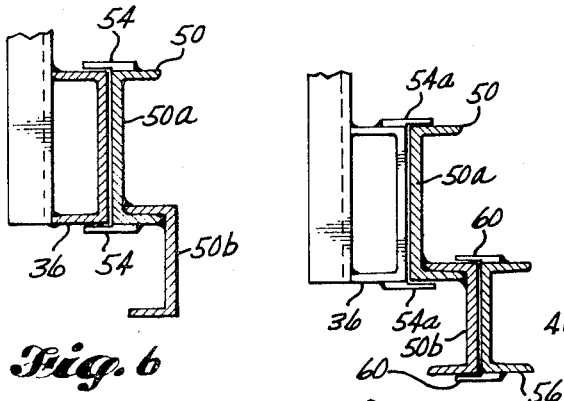
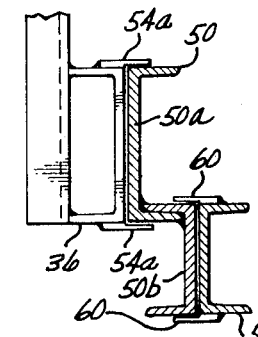
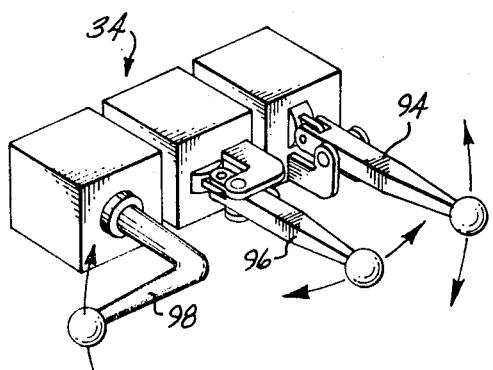

TUNNEL CLEANING APPARATUS

BACKGROUND OF THE INVENTION

1. Field of the Invention

This invention relates to a mobile cleaning apparatus, and particularly to such an apparatus adapted to clean wall surfaces such as the interior walls of a tunnel.

2. Description of the Prior Art

In a tunnel, such as an automobile freeway tunnel, it is desirable to periodically clean the walls from accumulations of automobile exhaust, etc. Generally, such cleaning has been accomplished manually (i.e., by a man manipulating a brush or other cleaning apparatus). Obviously, during such a cleaning operation, the tunnel must be either partially or completely closed down to automobile traffic. Thus, it is desirable, not only for reasons of minimizing labor costs, but also in accomplishing the cleaning operation as quickly and efficiently as possible, to provide an effective mobile cleaning apparatus which can move through the tunnel and properly clean the tunnel wall surfaces. Also, it is important that the apparatus be able to travel with the flow of traffic, and hence in a one way tunnel, be able to clean surfaces on both the right and left sides of the apparatus.

The prior art shows various surface cleaning devices. For example, Grant, U.S. Pat. No. 3,099,852, discloses a brush that is mounted on a telescoping boom that is angularly movable. In addition, there is a mechanism on the outer end of the boom to adjust the angular position of the brush.

Ventrella, U.S. Pat. No. 3,196,472, discloses a brush mounted on the end of an articulated boom. The movement of the brush is accomplished very much in the manner in which movement of a human arm is accomplished.

Whitsitt, U.S. Pat. No. 1,823,222, discloses an apparatus for washing the side of a railroad car. This apparatus is adapted for lateral movement toward the railroad car.

Byron et al, U.S. Pat. No. 2,253,609, discloses a portable car cleaning machine. Lateral movement is accomplished by swinging the brush on a frame that rotates about a vertical axis so that the brush swings into or away from the car.

Wilson, U.S. Pat. No. 2,636,198, discloses a portable brush machine mounted on a forklift. The forklift mechanism accomplishes vertical adjustment, while there is a hydraulic cylinder for lateral movement.

Wilson, U.S. Pat. No. 2,804,635, discloses a washing machine mounted to a framework resembling a portable scaffolding.

Rousseau, U.S. Pat. No. 2,876,472, discloses a cleaning machine mounted on a forklift. A brush has a spring mounting to cause the brush to be pressed against a vehicle to be washed.

Liekwig, U.S. Pat. No. 2,950,492, discloses a portable vehicle washing machine with a cleaning brush mounted for rotation about a verticle axis. This brush can be retracted from its extended position.

Other patents which are cited to disclose various background information are: Petite, U.S. Pat. No. 2,865,034; Finn, U.S. Pat. No. 3,241,173; Wiebe, U.S. Pat. No. 3,228,125; Larsen, U.S. Pat. No. 3,284,831; Lenhart, U.S. Pat. No. 3,473,180; Lamarque, U.S. Pat. No. 3,532,070; and Posner, U.S. Pat. No. 3,543,319.

SUMMARY OF THE INVENTION

The present invention is a mobile cleaning apparatus adapted to clean surfaces such as interior walls of a tunnel. It comprises a mobile carrier, a base frame mounted to said carrier, a movable frame assembly mounted to this base frame and comprising first, second and third frame components for, respectively, vertical, lateral and rotational movement, and a surface cleaning member mounted to said movable frame so as to be adjustably movable vertically, laterally, and angularly. Desirably, these first, second and third frame components are positioned in respective planes transverse to the longitudinal axis of the carrier and generally proximate one another, with the first frame component tracking vertically to the base frame, the second frame component tracking laterally to the first frame component, and the third frame component rotatably mounted in the second frame component about a longitudinal axis of the cleaning apparatus, with the surface cleaning member (i.e., a brush assembly) being mounted to the third frame component.

In overall configuration, the base frame is mounted at the rear of the mobile vehicle (e.g., a flatbed truck) and upstanding therefrom. The cleaning assembly (i.e., a large rotatable brush and its associated components) is positioned on a framework which extends beyond the base frame and the movable frame assembly. There is an operator station at the forward end of the carrier, with vertical, lateral and rotatable operating instruments to cause corresponding vertical, lateral and angular movement of the cleaning assembly. There are other specific features of the present invention which will become apparent from the following specification and claims.

BRIEF DESCRIPTION OF THE DRAWINGS

FIG. 4 is a view similar to FIGS. 2 and 3, showing the brush assembly engaging a slanted tunnel wall;

FIG. 5 is a rear view showing only the base frame and vertically moving frame component of the present invention;

FIG. 6 is a sectional view taken along line 6—6 of FIG. 5;

FIG. 7 is a sectional view taken along line 7—7 of FIG. 5; and

FIG. 8 is a perspective view of the operating controls of the present invention.

DESCRIPTION OF THE PREFERRED EMBODIMENT

Figure 1:
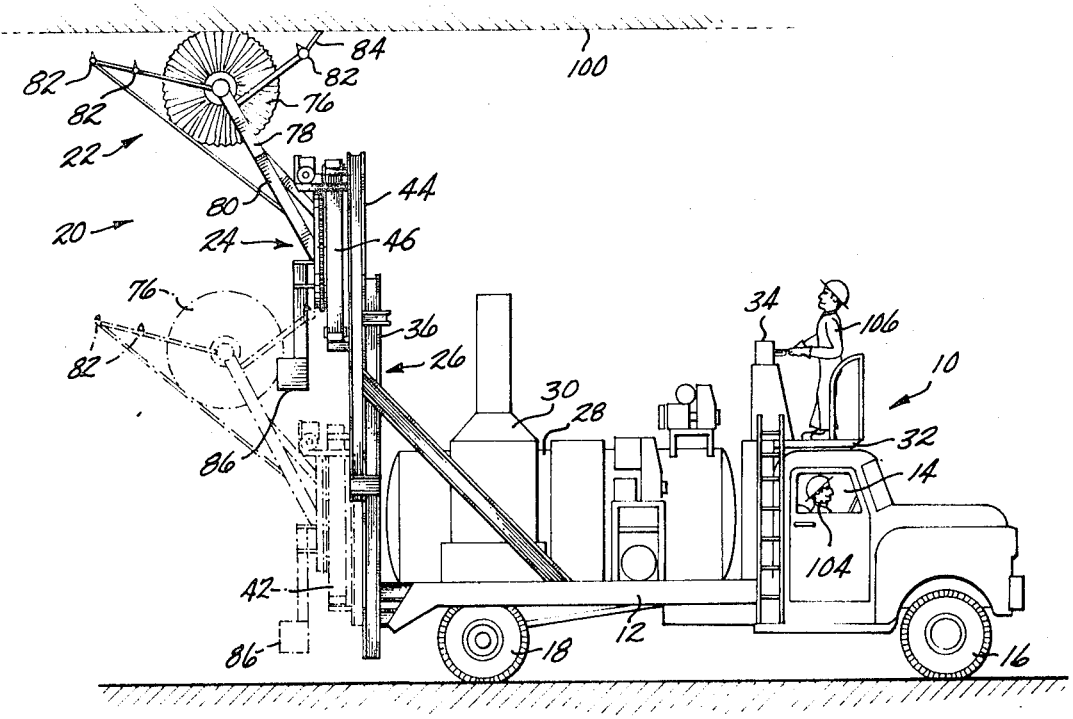
FIG. 1 is a side elevational view of the apparatus of the present invention.
Figure 2:
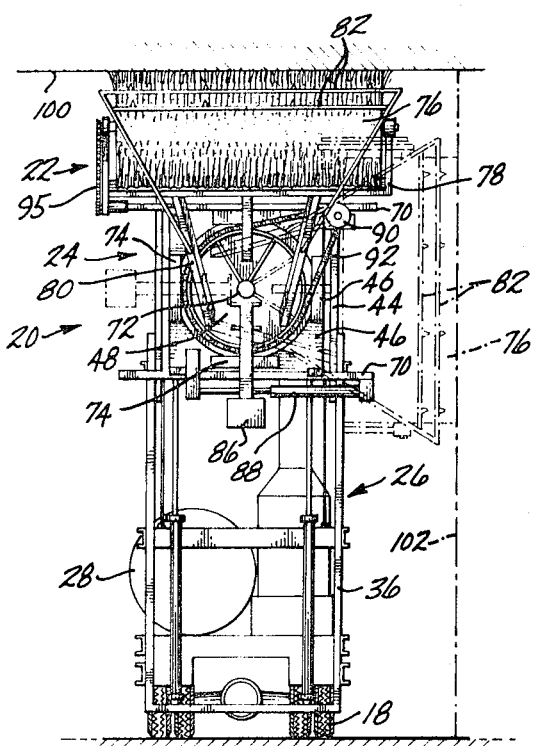
FIG. 2 is a rear elevational view thereof, showing the brush assembly cleaning the ceiling and upper side wall portion of a tunnel.

As disclosed herein, the present invention is constructed by adapting a conventional flatbed truck for use as a mobile carrier for the cleaning apparatus. Such a truck is shown at 10, having a rear flatbed 12, a driver location 14, front wheels 16 and rear wheels 18. Mounted to the rear of the truck is the cleaning apparatus 20. This comprises a brush assembly 22, a movable frame assembly 24 to which the brush assembly 22 is mounted, and a vertically oriented base frame 26 carrying the movable frame assembly 24 and the brush assembly 22 and mounted to the rear of the flatbed 12. Forward of the cleaning apparatus 20 various auxiliary equipment (e.g., a water tank 28, heating apparatus 30, etc) is mounted on the flatbed 12. Above the driver location 14 at the forward end of the truck is an operating platform 32, at which is located a control apparatus 34.

The aforementioned base frame 26 comprises two vertical beams 36 which are laterally spaced from each other and positioned on opposite sides of the truck 10 in a transverse plane. These vertical beams 36 serve as vertical rail members for the movable frame assembly 24. Upper, lower and intermediate cross members 38 are connected between the vertical beams 36, and lower channel members 40 are provided to mount the frame 26 to the flatbed 12.

The movable frame assembly 24 comprises a primary vertically movable frame component 42, intermediate vertically movable frame component 44, a laterally movable frame component 46 and a rotatable frame component 48. Each of these frame components 42 through 48 lie in a respective transverse plane (i.e., a plane perpendicular to the forward to rear longitudinal axis of the truck 10), with the planes being closely adjacent one another.

The vertically movable intermediate frame 44 comprises two vertical side members 50 and upper, lower and intermediate cross members 52. Each of the side members 50 is made up of two channels 50a and 50b welded together and has laterally extending flanges 54 engaging a respective one of the base frame vertical beams 36 so that the intermediate frame 44 tracks vertically to the base frame 26, the lower flanges 54 being mounted to the beams 50, and the upper flanges 54a being mounted to the beams 36. The vertically moving primary frame 42 likewise comprises vertical side members 56 and upper and lower cross members 58. The side members 56 are similarly provided with flange members 60 which engage the side members 50 of the intermediate frame 44 so that the primary frame 42 tracks vertically to the intermediate frame 44.

To cause vertical movement of the primary frame 42, there is provided a pair of hydraulic jacks 62 which extend from the lower base frame cross bar 38 to the intermediate cross bar 52 at the approximate midlength of the intermediate frame 44. Two pulley cords 66 reach upwardly from the middle base frame cross members 38, each over a respective one of two sheaves 68 attached to the top cross bar 52 of the intermediate frame 44, and downwardly to attach at 69 to the primary frame 42. Thus, when the hydraulic jacks 62 extend or retract to cause an increment of vertical movement of the intermediate frame 44, the pulley assembly 66-68 causes the primary frame 42 to move through two increments of vertical movement.

With reference to FIGS. 1-4, the primary vertically movable frame component 42 has upper and lower beam members 70 horizontally and transversely aligned, to which the aforementioned laterally movable frame component 46 tracks. (For clarity of illustration, these beam members 70 are not shown in FIG. 5.) This laterally moving frame component 46 has an overall square configuration, and carries on a journal mounting 72 the rotatable frame component 48. This frame component 48 has a flat circular configuration and is held to the frame 46 by means of four retaining members 74 at the four sides of the frame 46.

The aforementioned brush assembly 22 is mounted to this rotatable frame 48. This brush assembly comprises a large cylindrically shaped brush 76 mounted to a U-shaped frame 78 for rotation about the longitudinal center axis of the brush 76. The frame 78 is in turn mounted to the rotatable frame component 48 by means of struts 80. The axis of rotation of the brush 76 lies in a transverse plane and is perpendicular to a line drawn from the center of the frame 48 through the center of the brush 76.

Spray bars 82 are mounted to the frame 78 and struts 80 to direct water outwardly toward a wall surface both in front of and behind the brush 76. Extended forwardly from the front spray bars 82 are a pair of guides 84 which are on opposite ends of the brush 76 and so positioned that when the guides 84 are just in contact with a surface to be cleaned, the brush 76 is located for proper engagement of such surface. A counterbalancing weight 86 is attached to the rotatable frame 48 at a location diametrically opposite that of the brush 76.

To move the frame 46 laterally with respect to the primary frame component 42, a hydraulic jack 88 is connected between these two frames 42 and 46. To rotate the frame 48, there is a motor 90 having a chain drive 92, the chain 92 engaging a peripheral circular flange 93 on the frame 48. A suitable drive mechanism 95 is provided to rotate the brush 76, and suitable power is supplied to the various actuating components and drive mechanism 62, 88, 90 and 95 by a power source on the flatbed 12.

The control apparatus 34 of the present invention is illustrated in detail in FIG. 8. This apparatus comprises a first vertically movable control lever 94 which controls the actuator 62, with up or down movement of the lever 94 causing corresponding up or down movement of the frame 42. There is a second laterally movable control lever 96 which controls the actuator 88, with right or left movement of the lever 96 causing corresponding right or left movement of the frame 46. A third lever 98, angularly movable about a longitudinal axis, controls the direction of movement of the motor 90, with clockwise or counter-clockwise movement of the lever 98 causing a corresponding movement of the frame 48.

To describe the operation of the present invention, let it be assumed that it is desired to clean the top and side walls 100 and 102, respectively, of a tunnel. With reference to FIG. 1, the truck 10 is driven into a tunnel; the lever 94 is moved up to move the brush assembly 22 from the lower position shown in dotted lines in FIG. 1 to the upper position shown in full lines in FIG. 1, where the guide members 84 just come into engagement with the tunnel top wall 100. As the driver 104 moves the truck 10 through the tunnel at a moderate speed (e.g., 1½ miles per hour), an operator 106 on the platform 32 observes the two guide members 84 in relation to the top wall 100 and keeps the brush 76 in proper position by manipulating the three control levers 94, 96 and 98, with the brush cleaning the surface 100.

Let it be assumed that a second pass is made through the tunnel to clean the upper portion of the side wall 102. By means of the lever 98, the brush assembly is rotated through 90° so that the brush 76 is vertically aligned so as to be in proper engagement with the side wall 102, as shown in dotted lines in FIG. 2. As described above, the operator 106 observes the guide members 84 to make sure that the brush 76 is in proper engagement with the wall surface 102. In the event that the driver 104 is driving along a line which is not precisely equally distant from the side wall 102, the operator 106 moves the lever 96 approximately to insure proper engagement of the brush with the wall surface.

Figure 3:
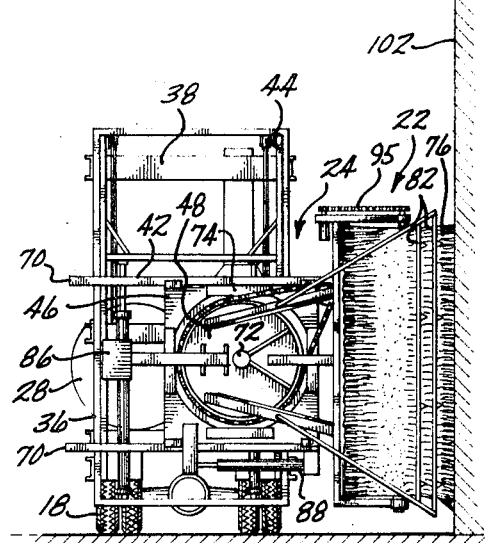
FIG. 3 is a view similar to FIG. 2, with the brush assembly cleaning a lower side wall portion of the tunnel.

As shown in FIG. 3, the apparatus is making a third pass through the tunnel cleaning a lower portion of the side wall 102. Because of the arrangement of the primary and intermediate vertically movable frames 42 and 44, the frame assembly 24 is capable of substantial vertical travel. Thus it is possible for the brush assembly 22 to reach to a top wall of substantial height, and yet be moved to near ground level.

In FIG. 4, the cleaning apparatus is shown operating on an upper slanted wall 108. In this instance, the brush 76 is at an approximate 45° angle with the vertical. Again, the operator 106 observes the guide members 84 to see that they are just engaging the wall surface 108, and manipulates the three levers 94, 96 and 98 to move the brush 76 either vertically, laterally or agularly to insure proper engagement of 76 with the wall surface 108. In the instance where there is a tunnel for one way automotive traffic, as the truck 10 moves through the tunnel with the traffic, the cleaning apparatus 20 must be manipulated to be positioned on both the right and left hand side of the truck 10 to accomplish the cleaning of both side walls of the tunnel. With the rotatable frame 48 being able to be swung to either side to a vertical position or further downwardly from a vertical side position, this can readily be accomplished with the apparatus of the present invention.

What is claimed is:

1. A mobile cleaning apparatus adapted to clean surfaces, such as side and top walls of a tunnel, said apparatus comprising:
   a. a mobile carrier having a front to rear longitudinal axis and adapted for forward travel through a tunnel,
   b. a base frame mounted to said carrier,
   c. a movable frame assembly mounted to said base frame so as to be movable with respect to the base frame and comprising three interconnected frame components, namely:
      1. a first frame means vertically movable with respect to said base frame,
      2. a second frame means laterally movable with respect to said base frame,
      3. a third frame means rotatably movable with respect to said base frame about an axis generally parallel to the longitudinal axis of said mobile carrier,
   d. a surface cleaning member mounted to said movable frame assembly in a manner to be movable with respect to said base frame and said carrier, vertically, laterally and angularly in a plane generally transverse to said longtudinal axis, whereby as said carrier travels along a surface to be cleaned, said cleaning member can be moved vertically, laterally, and angularly so as to be in proper working engagement with said surface.

2. The apparatus as recited in claim 1, wherein said first, second and third frame means each are positioned in a respective one of three generally parallel planes which are substantially transverse to the longitudinal axis of the carrier, and generally proximate to one another.

3. The apparatus as recited in claim 1, wherein said first frame means is mounted to the base frame and vertically movable along said base frame, said second frame means is mounted to the first frame means and movable laterally along said first frame means, and said third frame means is mounted to said second frame means so as to be movable laterally and vertically with said second frame means.

4. The apparatus as recited in claim 3, wherein said first vertically movable frame means comprises a primary frame which is vertically movable along the base frame and carries said second and third frame means, said first frame means further comprising an intermediate frame also vertically movable along said base frame, said apparatus further comprising actuator means to move said intermediate frame vertically and pulley means interconnecting with said primary frame and said intermediate frame whereby an increment of movement of said intermediate frame causes two increments of movement of said primary frame.

5. The apparatus as recited in claim 4, wherein said base frame comprises vertically oriented rail members, and said primary frame and said intermediate frame are arranged to track vertically to said rail members.

6. The apparatus as recited in claim 5, wherein said pulley means comprises sheave means connected to said intermediate frame and cord means connecting to said carrier, extending over said sheave means and connecting to said primary frame.

7. The apparatus as recited in claim 3, wherein said base frame comprises vertically oriented rail member means, with said first frame means being arranged to track thereto, said first frame means comprising laterally oriented rail member means, with said second frame means being arranged to track thereto, and said second frame means comprising rotary mounting means with said third frame means being mounted thereto, said apparatus further comprising first actuating means acting between said carrier and said first frame means to cause vertical movement of said first frame means, second actuating means acting between said first and second frame means to cause lateral movement of said second frame means, and third actuating means acting between said second and third frame means to cause angular movement of said third frame means.

8. The apparatus as recited in claim 7, wherein said vertically movable frame means comprises a primary frame which is vertically movable along said base frame and an intermediate frame also vertically movable along said base frame, said first actuator means further comprising pulley means interconnecting with said frame means and said intermediate frame, whereby an increment of movement of said intermediate frame causes two increments of movement of said primary frame.

9. The apparatus as recited in claim 7, wherein said first, second and third frame means each are positioned in a respective one of three generally parallel planes which are transverse to the longitudinal axis of the carrier, said planes being generally proximate to one another.

10. The apparatus as recited in claim 1, wherein said surface cleaning member comprises brush means and means to support said brush means from said third frame outwardly thereof, and guide means spaced from said brush means and arranged to be located proximate the working location of said brush means, whereby said brush means can be adjusted laterally, vertically and angularly with reference to said guide means.

11. The apparatus as recited in claim 1, wherein said carrier comprises a powered vehicle having a driver's location at a forward location of said vehicle, with said base frame, said movable frame assembly and said surface cleaning member being positioned at a rearward location of said vehicle, said vehicle having an operating station at a forward location of said vehicle, said apparatus further comprising control means at said operating station to control vertical, lateral and angular position of said cleaning member.

12. The apparatus as recited in claim 11, wherein said control means comprises instrument means movable vertically, laterally and angularly, causing, respectively, corresponding vertical, lateral and angular movement of said surface cleaning member.

13. The apparatus as recited in claim 12, wherein said instrument means comprises a first vertically movable instrument to cause vertical movement of said first frame means, a second laterally movable instrument to cause lateral movement of said second frame means, and a third angularly movable instrument to cause angular movement of said third frame means.

14. The apparatus as recited in claim 1, wherein said third frame is rotatable about at least a semi-circular arc, whereby said surface cleaning member can be rotated to both right and left cleaning positions.

* * * * *